Patented May 9, 1950

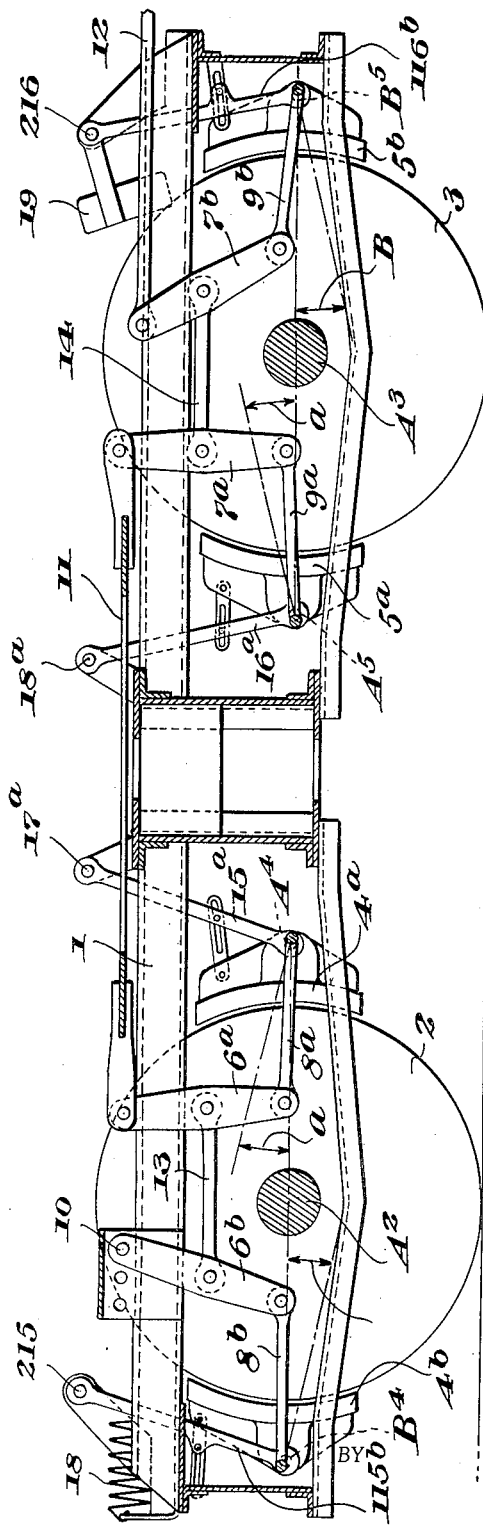

2,506,990

UNITED STATES PATENT OFFICE 2,506,990

CLASP BRAKE

Bert Henry Browall, Malmo, Sweden, assignor to Svenska Aktiebolaget Bromsregulator, Malmo, Sweden, a corporation of Sweden Application September 6, 1945, Serial No. 614,640

3 Claims. (Cl. 188—56)

This invention relates to vehicle brakes and especially to railway vehicle brakes in which brake shoes are provided for application to the wheels of the vehicle at both ends thereof. More particularly the invention relates to vehicle brakes of this type, in which the brake shoes for application to the wheels at the opposite ends of the vehicle are connected to a common source of brake power, for instance a fluid pressure brake cylinder, by a brake rigging for transmitting the brake power to the brake shoes at the opposite ends of the vehicle.

During braking of the vehicle when running, the vehicle is subjected to a moment of forces created by the inertia of the vehicle and the load thereof and by the friction of the braked wheels of the vehicle against the rails, which moment of forces may materially change the distribution of the weight of the vehicle and the load thereof on the wheels at the opposite ends of the vehicle, especially in case the vehicle is a bogie or truck and the load thereof is a car body pivotally supported at one end on the bogie or truck. Having regard to the direction in which the vehicle is running when braking occurs, the said moment of forces acts in the direction of increasing the part of the weight of the vehicle and the load thereof reposing on the wheels at the foremost end of the vehicle and correspondingly decreasing the part of said weight reposing on the wheels at the hindmost end of the vehicle. The vehicle may run sometimes in one direction, sometimes in the other direction, and generally sometimes the wheels at one end, sometimes the wheels at the other end of the vehicle may become more loaded than the wheels at the opposite end of the vehicle during a braking operation. For this reason the general practice is to construct the brake rigging so that it distributes the brake power equally on the brake shoes coacting with the wheels at the two ends of the vehicle, so that the pressures of the brake shoes against the wheels of the vehicle at the two ends thereof will be equal. Several attempts have been made, however, to control the distribution of the total pressure of the brake shoes against the wheels at the opposite ends of the vehicle automatically in dependence on the direction in which the vehicle is running when braking occurs, for increasing the pressure of the brake shoes against the wheels at the foremost end of the vehicle and correspondingly decreasing the pressure of the brake shoes against the wheels at the hindmost end of the vehicle, the object being to make possible a higher braking ratio (that is the ratio of the total pressure of the brake shoes against the wheels of the vehicle to the weight of the vehicle and the load thereof) without incurring the risk of sliding the hindmost wheels of the running vehicle on a full application of the brakes. An interesting contribution to this art is to be found in the U. S. Patent No. 2,369,543 to Diurson who suggests means for deriving from the friction of the braked wheels against the brake shoes a force acting in one direction or the other according to whether the vehicle is running in one direction or the other when braking occurs, and for distributing this force in opposite directions on the brake shoes at the opposite ends of the vehicle, namely in the direction for adding part of said force to the brake power transmitted to the brake shoes at the foremost end of the vehicle, and for subtracting the other part of said force from the brake power transmitted to the brake shoes at the hindmost end of vehicle. The means suggested by Diurson comprises a special lever and link mechanism in addition to the conventional brake rigging, which special lever and link mechanism connects the brake shoes at the opposite ends of the vehicle with each other.

One object of the present invention is to obtain in a much more simple way a result similar to that aimed at by Diurson in the construction shown in Fig. 1 in his aforesaid U. S. Patent No. 2,369,543. Another object of the invention is to obtain the said desired result without using any special members in excess of those pertaining to a normal or conventional brake rigging. Still another object of the invention is to utilize the brake shoe hangers for the purpose of adding to, and subtracting from, the brake power transmitted by the brake rigging to the brake shoes coacting with the wheels at the foremost and the hindmost end of the vehicle, respectively, components of the forces created in the hangers by the frictional forces exerted by the braked wheels on the brake shoes, which components as well as the said forces act in one or the other of two opposite directions according to whether the vehicle is running in one direction or the other when braking occurs.

For these objects and such further objects as may become apparent from the following description in which reference is had to the accompanying drawing, the invention consists in the principal features and organization of parts described hereinafter and then pointed out in the appendant claims.

In the drawings the figure is a somewhat diagrammatic sectional side view of a railway vehicle in the form of a bogie or truck for pivotally supporting a car body at one end thereof, and illustrates one form of the invention as applied to the brakes of such a bogie or truck for the purpose of compensating, wholly or in part, for such changes in the distribution of the weight of the bogie or truck and the load thereon upon the wheels at the opposite ends of the trucks as are caused, when braking, by the inertia of the car body supported on the bogie or truck and by the friction of the braked wheels against the rails.

In the figure, 1 denotes the frame of the bogie or truck and A2 and A3 the wheel axles provided with the wheels 2 and 3, respectively. Brake shoes 4a, 4b and 5a, 5b are provided for application to the wheels 2 and 3, respectively, at the opposite ends of the truck. All the brake shoes are connected to a common source of brake power, for instance a pressure fluid brake cylinder (not shown in the drawing), by a brake rigging which may be of any normal or conventional type. In the example shown the brake rigging comprises two pairs of connected brake levers 6a, 6b and 7a, 7b respectively, at the opposite ends of the vehicle, to which brake levers the brake shoes are connected by brake beams 8a, 8b and 9a, 9b, respectively. The lever 6b has one end pivoted to a fixed fulcrum on the vehicle frame at 10. All the other levers are floating levers, the levers 6a and 7a being connected to each other by a connecting rod 11, and the lever 7b being connected to a main brake pull rod 12 for transmitting the brake power to the brake levers on the truck. The levers 6a and 6b are connected to each other by a rod 13, and the levers 7a and 7b are connected to each other by a rod 14. The brake shoes 4a and 5a are suspended by means of hangers 15a and 16a respectively, pivoted to fixed fulcrums on the truck frame 1 at 17a and 18a, respectively.

Each of the hangers 15a and 16a for the inner brake shoes 4a and 5a is so arranged in accordance with the present invention that, when moving the brake shoes into contact with the wheels, the movement of the center of the pivoted connection of the brake shoe to its hanger, at least at the moment the brake shoe is making contact with the wheel, will have a direction forming with a radius drawn from the center of the wheel axle A2 or A3 to the center of the pivotal connection A4 or A5 of the brake shoe 4a or 5a with the hanger 15a or 16a, respectively, a considerable angle $\alpha$ above said radius. This means that in the said position of the parts the angle between the said radius and the hanger is an obtuse one. As a result of this arrangement the force created in the hanger by the frictional force exerted by the braked wheel on the brake shoe will have a component acting on the brake shoe either in the same direction in which the brake shoe is pressed against the wheel by the brake power transmitted by the brake rigging, or in the opposite direction, according to whether the vehicle is running in one direction or the other during the braking operation. Having regard to the direction in which the vehicle is running when braking occurs, the aforesaid component of the force in each of the hangers for the inner brake shoes coacting with the wheels at the foremost end of the vehicle will tend to press these brake shoes against the wheels and will thus be added to the brake power transmitted to the said brake shoes by the brake rigging, whereas the aforesaid component of the force in the hangers for the inner brake shoes coacting with the wheels at the hindmost end of the vehicle will tend to move these brake shoes away from the wheels and will thus be subtracted from the brake power transmitted to said brake shoes by the brake rigging.

In the example shown the hangers 115b and 116b for the outer brake shoes 4b and 5b, are pivoted to fixed fulcrum brackets on the frame 1 at 215 and 216, respectively. Each of said hangers is so arranged that, when moving the brake shoes into contact with the wheel, the movement of the center of the pivotal connection of the brake shoe to the hanger, at least at the moment the brake shoe is making contact with the wheel, will have a direction forming with a radius drawn from the center of the wheel axle A2 or A3 to the center of the pivotal connection B4 or B5 of the brake shoe 4b or 5b to the hanger 115b or 116b, respectively, a considerable angle $\beta$ below said radius. This means that in the said position of the said parts the angle between the said radius and the hanger in question is an acute one. As a result of this arrangement the forces created in the hangers 115b and 116b for the outer brake shoes 4b and 5b by the frictional forces exerted on the brake shoes by the braked wheels will have components acting on the brake shoes in directions for adding such components to the brake power transmitted by the brake rigging to the brake shoes coacting with the foremost wheels of the vehicle, and for subtracting such components from the brake power transmitted to the brake shoes coacting with the hindmost wheels of the vehicle, irrespective of whether the vehicle is running in one direction or the other during the braking operation.

As will be easily understood from the foregoing, either the hangers for the inner brake shoes or the hangers for the outer brake shoes, or both, may be utilized for the purpose of the invention, which of course is applicable also in case the vehicle is provided only with inner, or only with outer, brake shoes.

When the vehicle is provided both with inner and outer brake shoes and the hangers for all the brake shoes are utilized for the purpose of the invention, the hangers for both the inner and outer brake shoes at each end of the vehicle preferably may be arranged so that they, when the brake shoes are in contact with the wheels, are substantially parallel to one another, for instance equally inclined in the same direction to the vertical as shown. This involves that generally the fulcrum brackets for the pivots 17a, 18a, 215 and 216 for the hangers will have to be displaced in relation to the conventional location of the fulcrum brackets for the brake shoe hangers. The hangers 115b and 116b may be acted upon by a spring 18, or a counterweight 19, or the like, to assist in moving the brake shoes suspended by these hangers away from the wheels on release of the brakes after a braking operation.

What I claim and desire to secure by Letters Patent is:

1. In a railway vehicle, especially a pivoted truck, having pairs of wheels at its two ends, and clasp brakes comprising brake shoes applied to both sides of each of the wheel pairs at the two ends of the vehicle, and movable members suspending the brake shoes, each brake shoe being pivoted to its suspending member, and the latter being so arranged that, when moving the brake shoe into contact with the wheel to which it is applied, the center of the pivot of the brake shoe moves in a direction deviating considerably from being radial in relation to the wheel, an improvement characterized by the fact that the movable suspending members for the brake shoes applied to the opposite sides of each pair of wheels are so asymmetrically arranged in relation to a vertical plane through the axis of the pair of wheels that, when moving the brake shoes into contact with the wheels, the centers of the pivots of the brake shoes applied to the wheels inside thereof move in directions which with lines drawn from said centers to the axis of the pair of wheels form considerable angles above said lines, whereas the centers of the pivots of the brake shoes applied to the wheels outside thereof move in directions which with lines drawn from said centers to the axis of the pair of wheels form considerable angles below said lines.

2. An improvement in railway vehicle brakes as claimed in claim 1 and further characterized by the fact that the movable members suspending the brake shoes are in the form of hangers which at each of the pairs of wheels at the two ends of the vehicle are so arranged that the hangers for the brake shoes applied to the wheels inside thereof form obtuse angles with lines drawn from the centers of the pivots of the brake shoes to the axis of the pair of wheels, whereas the hangers for the brake shoes applied to the wheels outside thereof form acute angles with lines drawn from the centers of the pivots of the brake shoes to the axis of the pair of wheels.

3. In a railway vehicle truck having pairs of wheels at its two ends, and clasp brakes comprising brake shoes applied to both sides of each of the end wheels of the truck, brake shoe hangers to which said brake shoes are pivoted pivotally supported at points disposed above the pivot points of said brake shoes, said hanger support points being so disposed that the hangers for all the clasp brake shoes at the wheels at the two ends of the truck take positions substantially inclining toward a transverse vertical plane through the middle of the truck.

BERT HENRY BROWALL.

REFERENCES CITED

The following references are of record in the file of this patent:

UNITED STATES PATENTS

| Number | Name | Date |
|---|---|---|
| 423,158 | Hubbard | Mar. 11, 1890 |
| 808,059 | Paris | Dec. 19, 1905 |
| 999,849 | Olines et al. | Aug. 8, 1911 |
| 1,102,208 | Burton | June 30, 1914 |
| 1,168,604 | Chandler | Jan. 18, 1916 |
| 1,198,999 | Dunaway | Sept. 19, 1916 |
| 1,305,468 | Kadel | June 3, 1919 |
| 1,385,730 | Tatum | July 26, 1921 |
| 1,807,575 | Mussey | May 26, 1931 |
| 2,171,514 | Hedgcock | Aug. 29, 1939 |
| 2,369,543 | Diurson | Feb. 13, 1945 |
| 2,385,909 | Aurien | Oct. 2, 1945 |
| 2,398,285 | Browall | Apr. 9, 1946 |